July 31, 1962  F. S. LANDIS  3,046,873
BALING DEVICE

Filed July 26, 1961 5 Sheets-Sheet 1

INVENTOR.
FRANK S. LANDIS
BY
ATTORNEYS

INVENTOR.
FRANK S. LANDIS
BY
ATTORNEYS

July 31, 1962  F. S. LANDIS  3,046,873
BALING DEVICE

Filed July 26, 1961  5 Sheets-Sheet 5

INVENTOR.
FRANK S. LANDIS
BY
ATTORNEYS

United States Patent Office 3,046,873
Patented July 31, 1962

3,046,873
BALING DEVICE
Frank S. Landis, Lancaster, Pa., assignor to Bayuk Cigars Incorporated, Philadelphia, Pa., a corporation of Maryland
Filed July 26, 1961, Ser. No. 127,058
7 Claims. (Cl. 100—215)

This invention relates to a device useful in baling loose material such as is normally transported and stored in bales. The device is of particular utility in the baling of tobacco and will be described in conjunction with its use with tobacco, it being understood that it is also useful with other analogous loose material.

The device in accordance with this invention is of particular utility in that it provides for the rapid and effective compressing of tobacco into a compact accurately determined mass. It provides for the continuous supplying of tobacco to the device in order that repeated batches of tobacco can be compressed rapidly one after the other.

Further the device of this invention is advantageous in that it provides for the tying of a bale while the bale is maintained under pressure, a standard twine tier being satisfactorily employed to effect the tying. Effecting the tying by the device of this invention under pressure provides for a greater spring back of the bale and hence tighter twine.

These and other objects of this invention will be made fully apparent on reading the following description in conjunction with the drawings in which.

Figures 1, 2, 3, 4, 5, 6:
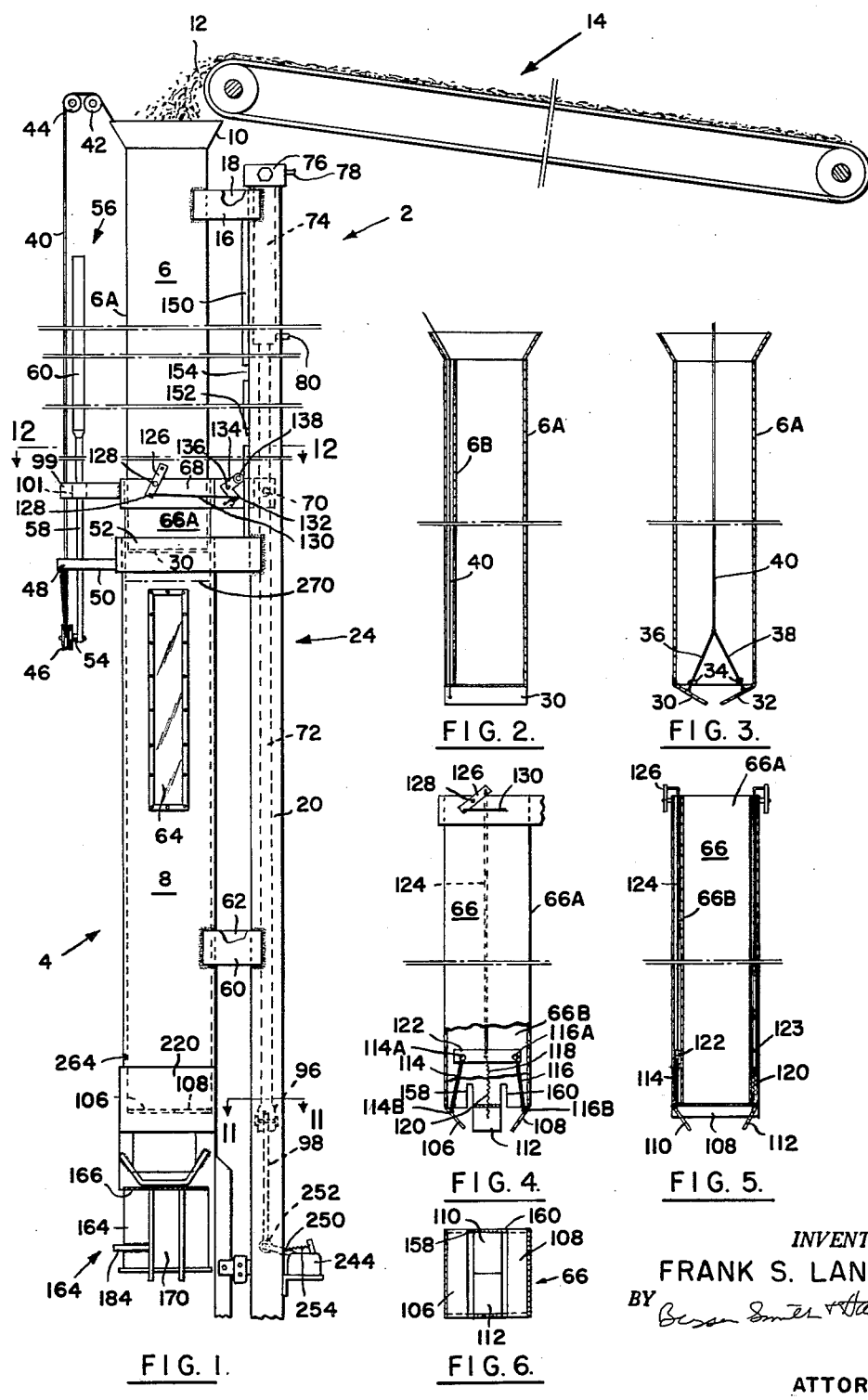
FIGURE 1 is a front elevation of a device in accordance with the invention.
FIGURE 2 is a vertical section through the upper portion of the tower shown in FIGURE 1 with the door incorporated therewith in the half open position.
FIGURE 3 is a view corrseponding to the view in FIGURE 2 showing the doors in the half open position.
FIGURE 4 is a front elevation of the hollow plunger of the device shown in FIGURE 1, partially broken away to show the door means incorporated therewith.
FIGURE 5 is a vertical section of the structure of FIGURE 4.
FIGURE 6 is a bottom plan view of the plunger shown in FIGURE 4.

Referring first to FIGURE 1, a device 2 in accordance with this invention has a tower indicated at 4 having an upper portion 6 and a lower portion 8, each of which is substantially square in cross-section, upper portion 6 being slightly smaller than lower portion 8 in cross-section.

Upper portion 6 has a peripheral wall 6A and an inner end wall 6B and has a flared open upper end 10 for the reception of pieces of tobacco leaf 12 which are supplied by a conventional conveyor indicated at 14.

Figure 11:
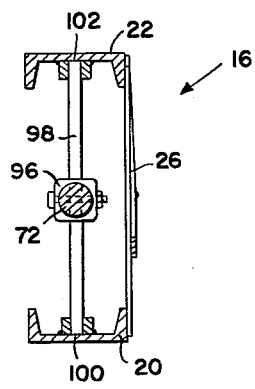
FIGURE 11 is a section taken on the plane indicated by the line 11—11 in FIGURE 1.

Upper portion 6 is welded to plates 16 and 18 which in turn are respectively welded to upstanding beams 20 and 22, respectively, which form a part of a supporting framework indicated at 24. Beams 20 and 22 are welded to braces indicated at 26 (FIGURE 11).

A pair of doors 30 and 32 are hingedly connected to the bottom of upper portion 6 as best seen in FIGURE 3. Doors 30 and 32 are each provided with a hook 34 respectively connected to lines 36 and 38 of, for example, wire or chain. Lines 36 and 38 are in turn connected to a line 40 of wire or chain, for example, which passes upwardly inside upper portion 6 around pulleys 42 and 44, around pulley 46 and secured at 48 to a bar 50 welded to a collar 52, which in turn is welded to beam 20 and lower portion 8 of tower 4. Pulley 46 is pivotally secured to a shaft 54 which is attached to rod 56 which has a relatively small lower portion 58 in cross-section and a relatively large upper portion 60 in cross-section.

The lower portion 8 of tower 4 is secured to beams 20 and 22 by plates 60 and 62 which are respectively welded to lower portion 8 and the beams. Lower portion 8 is provided with a transparent sight window indicated at 64.

Figure 9:
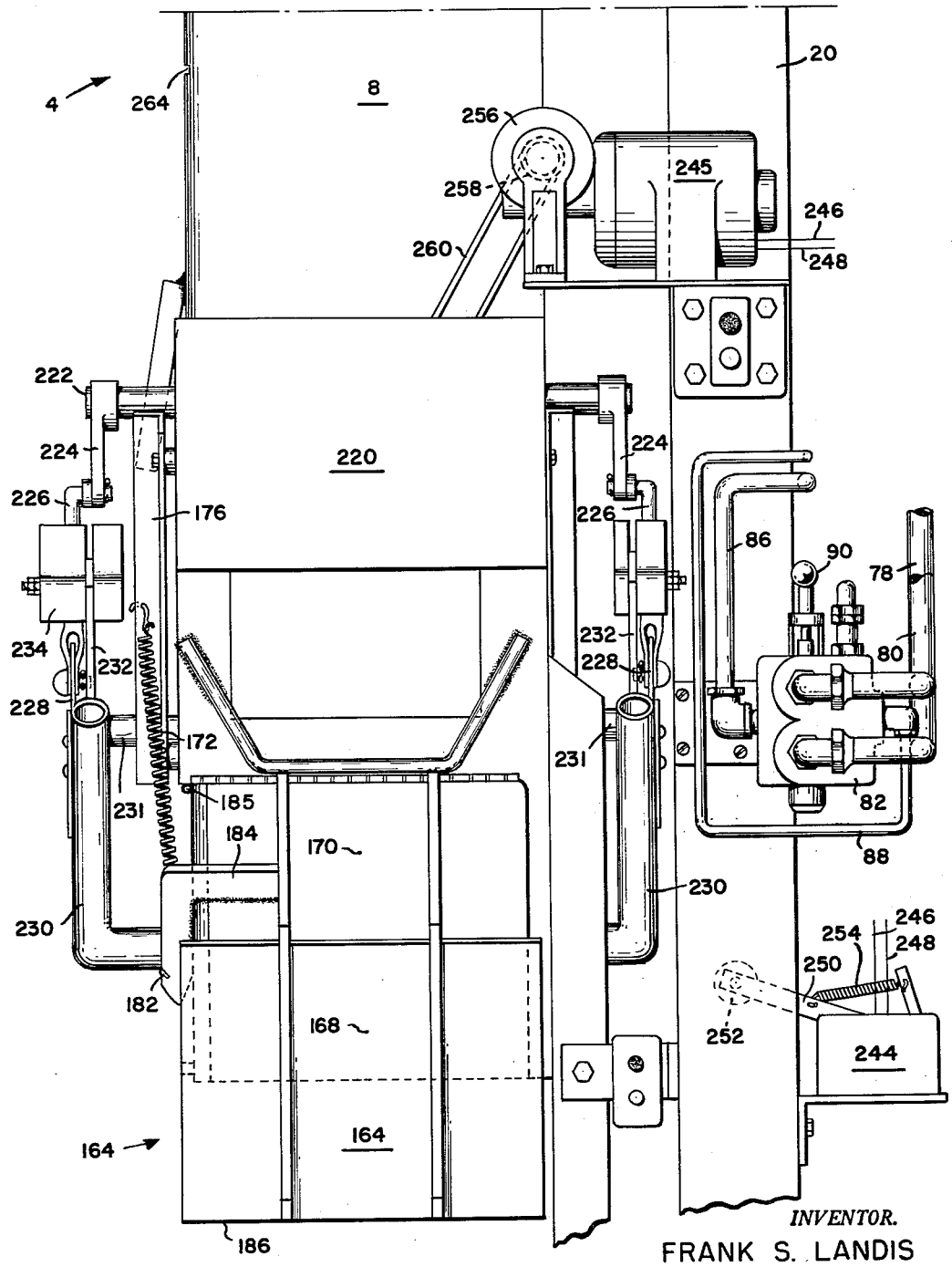
FIGURE 9 is an elevation of the apparatus in FIGURE 7 as viewed from the front thereof.

Referring to FIGURES 1, 4 through 6 and 12, a plunger 66 which is hollow and has a peripheral wall 66A and an inner wall 66B is telescoped inside lower portion 8 of tower 4 and over the exterior of upper portion 6. A collar 68 welded to plunger 66 is secured by a bolt 70 to a ramrod 72 of ram 74, which is secured to cross member 76 of framework 24. Ram 74 is actuated by hydraulic fluid supplied and returned by lines 78 and 80 which are connected to control valve 82 (see FIGURE 9) which in turn is connected to a source of hydraulic fluid under pressure (not shown) by line 86 and is connected to line 88 which is a return line to a reservoir (not shown). Valve 82 is controlled by a lever indicated at 90. As will be apparent, the hydraulic system for actuating ram 74 is conventional. A plate 99 is welded to collar 68 and is provided with an opening 101 for the free passage of portion 58 of rod 56 and the frictional engagement of portion 60 of the rod.

Figure 8:
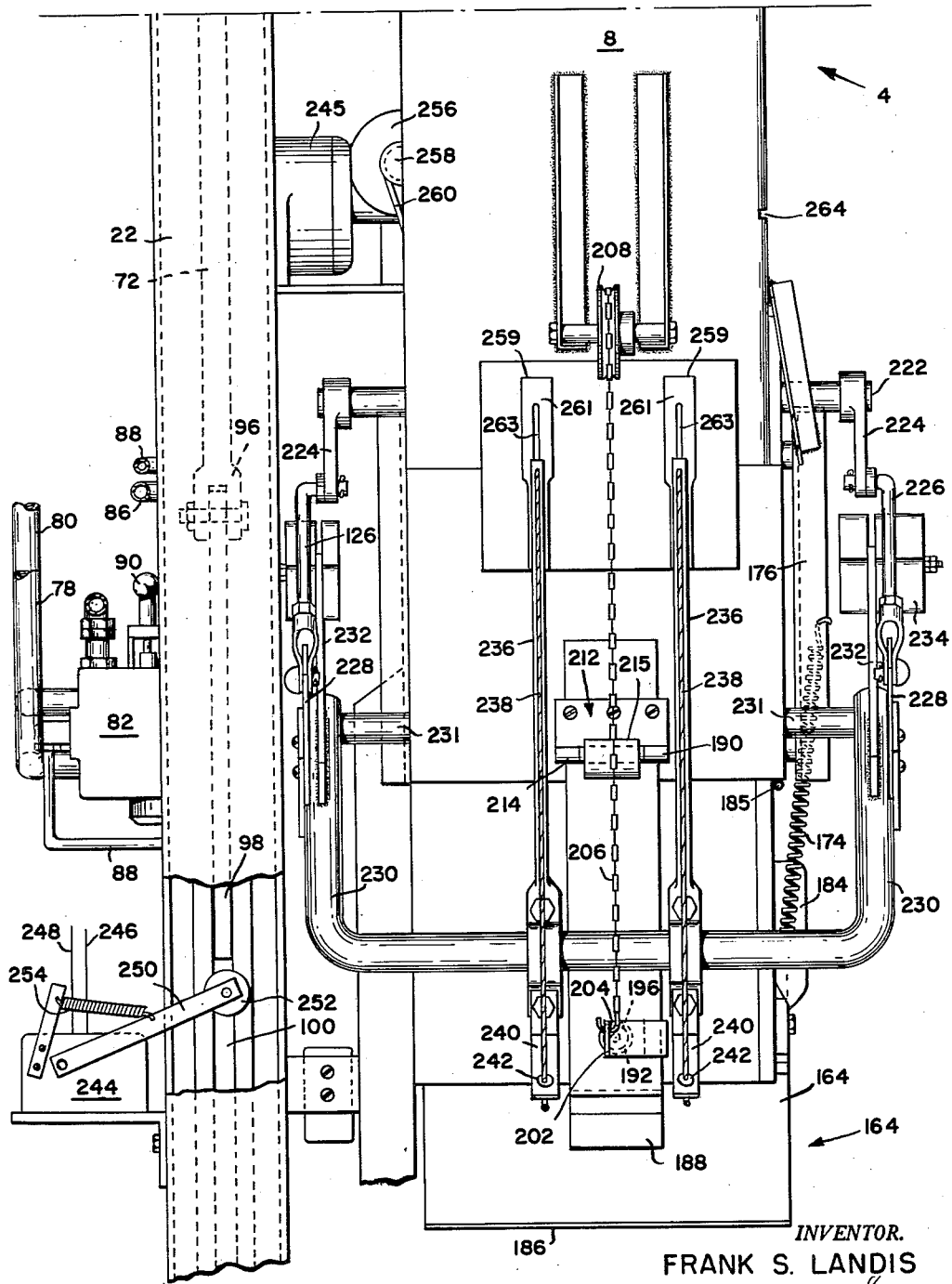
FIGURE 8 is an elevation of the apparatus shown in FIGURE 7 as viewed from the rear of the apparatus.
Figures 7, 10:
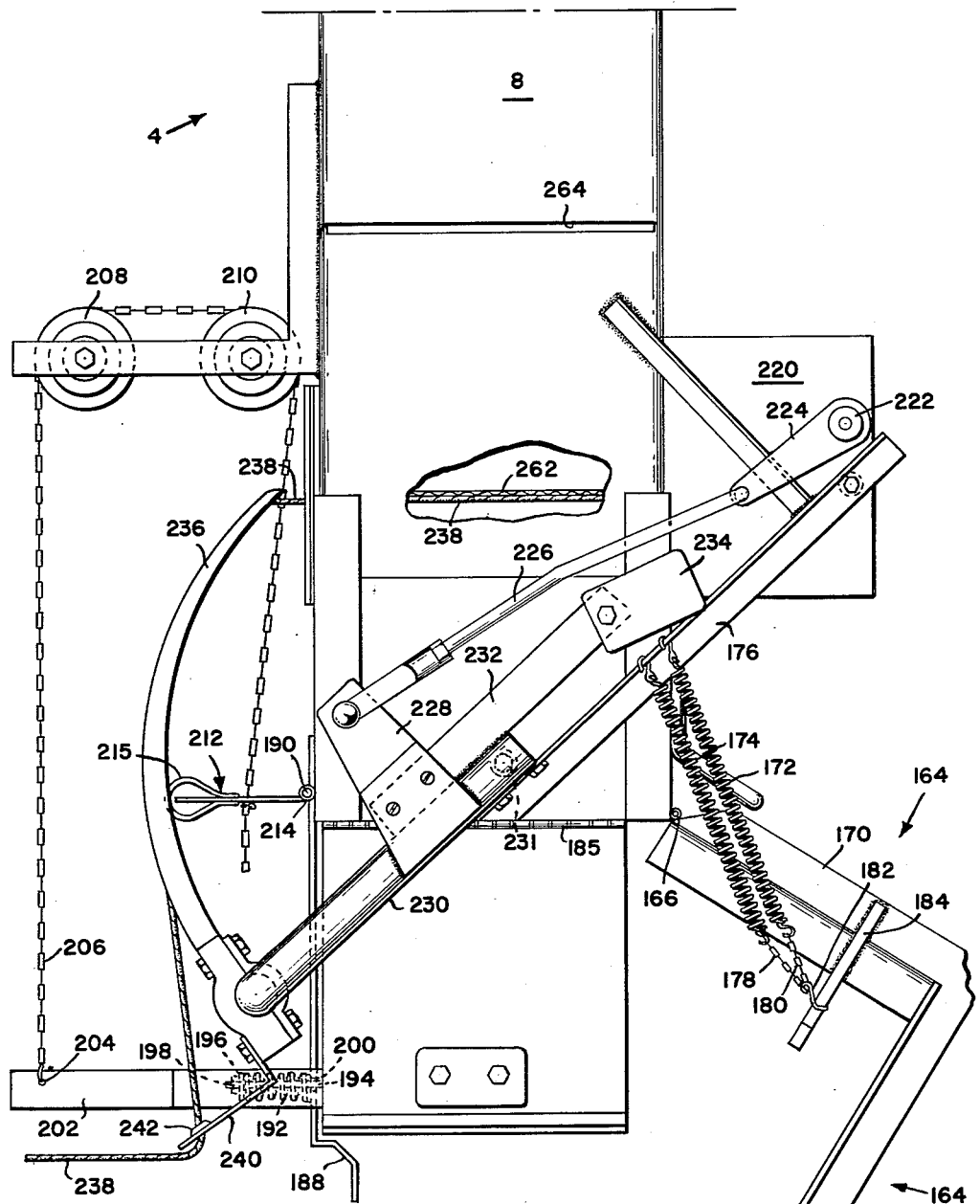
FIGURE 7 is an enlarged view of the left side lower portion of the tower of the device in FIGURE 1.
FIGURE 10 is a plan view (enlarged) of a portion of the door latch shown in FIGURE 7.

As best seen in FIGURE 8, the lower end of ramrod 72 is provided with a clevis 96 which is bolted to a slide 98; slide 98 rides in a track indicated at 100 on the interior of beam 20 and in a track indicated at 102 on the interior of beam 22 (FIGURE 11).

Figure 13:
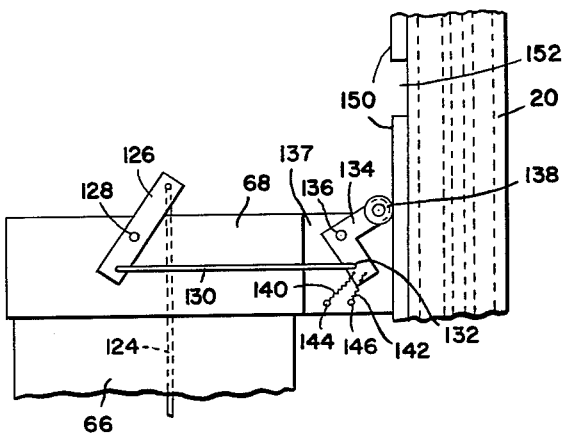
FIGURE 13 is an enlarged view of a portion of the plunger door operating mechanism shown in FIGURE 1.
Figure 12:
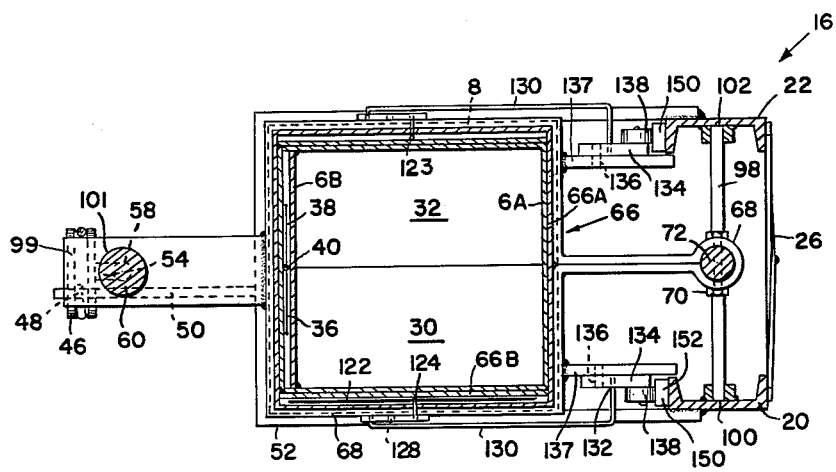
FIGURE 12 is a section taken on the plane indicated by the line 12—12 in FIGURE 1.
Figure 14:
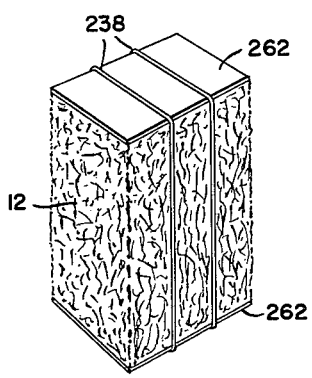
FIGURE 14 is a perspective view of a bale made by the apparatus of FIGURE 1.

Referring particularly to FIGURES 4 through 6, the bottom of the plunger 66 is provided with hinge doors 106, 108, 110 and 112, which are respectively connected to rods 114 and 116 and extension coil springs 118 and 120. Rods 114 and 116 and spring 118 are secured to a bar indicated at 122. Rods 114 and 116 are pivotally connected to bar 122 at 114A and 116A respectively and pivotally connected to doors 106 and 108 respectively at 114B and 116B. Spring 120 is secured to rod 123. A rod 124 is connected to bar 122. Rods 123 and 124 lead upwardly to levers 126, 126, being connected to the upper ends of levers 126, 126, as shown in FIGURES 4 and 13. Referring to FIGURES 4, 12 and 13, the lower ends of levers 126, 126 are pivotally connected at 128, 128 to rods 130, 130, which are pivotally connected at 132, 132 to toggle levers 134, 134 pivoted at 136, 136 on plates 137, 137 welded to collar 68. Rollers 138, 138 are revolvably secured to levers 134. Extension springs 140, 140 and 142, 142 are connected at one end to the lower ends of levers 134, 134 and in turn are connected to plates 137, 137 at 144, 144 and 146, 146, respectively. Rollers 138 engage strips 150, 150 mounted on beam 20 and provided with openings 152, 152 and 154, 154. As will be pointed out in the description of the operation, this structure functions to open and close doors 106, 108, 110 and 112.

Immediately above doors 106 and 108, there are provided openings 158 and 160 with corresponding openings in the opposite side of plunger 66, which are not shown, to accommodate the passage of twine and a needle carrying the twine for the purpose of tying up a bale.

Referring now to FIGURES 1, and 7 through 9, lower portion 8 is provided with a door 164 mounted on a hinge 166, the door being shown in the open position. The door 164 is L-shaped having a bottom portion 168 and a front portion 170. Door 164 is counter-balanced by extension coil springs 172 and 174 secured to an angle iron indicated at 176 and chains 178 and 180 secured to a hook 182 which engages a bar 184 welded to the front portion 170 of the door. Bar 184 is adapted to engage the exterior of hinged panel 185 to hold it in the closed position. Rear edge 186 of door 164 is adapted to be engaged by latch 188 which is pivoted at 190. Latch 188 is biased in the closed position by a compression coil spring 192 (FIGURE 10) surrounding a bolt 194 secured to the lower portion 8 of tower 4, the spring bearing against washer 196 and which in turn engages nut 198 of bolt 194. Bolt 194 passes through an opening 200 in member 202, which at one end is secured to latch 188 and at its opposite end has an opening 204 in which is secured a chain 206. Chain 206 passes over a pulley indicated at 208 and a pulley indicated at 210 and then passes downwardly to engage member 212, which is pivotally secured at 214 and has a leather loop 215 at its outer end. While it will be apparent that latch 188 can readily be operated manually, it is arranged to be operated automatically as will be described hereinafter.

The above described novel mechanism is adapted to be operated in conjunction with an automatic baling tier such as is well known in the art. It will be appreciated that it need not be so operated since the tying of the bale can be accomplished manually, however for rapid production the use of an automatic tier is desirable. The hereinafter described tier is conventional and hence will not be described in detail.

A conventional tier operating mechanism is indicated schematically at 220 and has a needle operating shaft indicated at 222. Shaft 222 is connected to levers 224 which in turn are pivotally connected to links 226 which are pivotally connected to plates 228 welded to yoke 230 which is pivoted to shafts 231. Arms 232 which are secured to plates 228 support counterweight 234. Needles 236 carrying twine 238 are secured to yoke 230. Each needle 236 has a bracket 240 with an eye 242 for guidance of twine 238. The twine tying mechanism 220 is actuated by a switch 244 (FIGURE 9) which is connected to motor 245 by leads 246 and 248. Switch 244 is operated by a lever 250 which has an operating roller 252 adapted to be engaged by slide 98 (FIGURE 8). Lever 250 is biased in the switch off position by an extension coil spring 254. Motor 245 drives a speed reducer 256 which in turn drives a pulley 258 carrying belt 260. Belt 260 drives the tier operating mechanism 220.

A pair of openings 259, 259 each have an overlying piece of leather 261 which can move inward of the opening, but not outward thereof and has a twine opening 263. As indicated above, the tier mechanism is old in the art and hence is described only briefly.

*Operation*

In the commencement of operation, plunger 66 is in the uppermost position with door panels 106, 108, 110 and 112 in the plunger and door panels 30 and 32 in the upper portion of tower 4, all being in the open position. The doors of the plunger are at the height indicated by the construction line 270 in FIGURE 1. The door 164 is in the closed position. A sheet 262 of fiberboard or cardboard in lower portion 8 rests on twine 238. Conveyor 14 is placed in operation discharging tobacco leaves into tower 4 where they accumulate on top of sheet 262. When the level of tobacco reaches the desired point as determined by sight through sight window 64, control handle 90 of valve 82 is moved to cause hydraulic fluid to pass through line 78 to the upper end of ram 74 to cause ramrod 72 to be moved downwardly with hydraulic fluid being exhausted from the lower part of the ram through line 80. As ramrod 72 moves downwardly it carries with it collar 68 and plunger 66. As plate 99, attached to collar 68, moves downwardly it carries with it enlarged portion 60 of rod 56 by virtue of the frictional engagement with the interior of opening 101. This results in the lowering of pulley 46 which in turn causes line 40 to move upwardly within upper portion 6 and through lines 36 and 38, closed door panels 30 and 32, in order to accumulate above these door panels the tobacco being delivered by conveyor 14. Collar 68 is free to move relative to enlarged portion 60. When collar 68 engages freely the lower smaller portion of rod 56 the weight of rod 56 holds the door panels closed. Immediately after the closing of door panels 30 and 32, levers 134, 134 are moved opposite openings 154, 154 and by virtue of springs 140, 140 and 142, 142, rollers 138, 138 enter openings 154 and on reaching the lower termini of the openings are cammed counterclockwise as they reengage strips 150, 150.

Through rods 130, 130, levers 126, 126 and rods 123 and 124 are raised to respectively close door 112 through spring 120 and raise bar 122 to close doors 106, 108 and 110 through rods 114 and 116 and spring 118.

The door panels of plunger 66 engage the tobacco and force it downwardly into a compact mass, the movement of ramrod 72 and hence of plunger 66 being arrested by operating valve lever 90 just before slide 98 engages roller 252 of switch 244. Then through the actuation of control lever 90, the flow through lines 78 and 80 is reversed to raise the ramrod 72 and hence plunger 66 above opening 264 in tower 4 (FIGURE 7) when the ramrod is stopped by the proper positioning of valve lever 90. A second sheet 262 is then inserted through opening 264 so as to lie on top of the compressed batch of tobacco. The ramrod and plunger 66 are then lowered to compress the tobacco into a tight bale which causes slide 98 to engage roller 252 of switch 244 and actuate the switch to start the operation of motor 245 and hence the operation of sewing mechanism 220. The thus formed bale is then tied with twine in a manner well known to the art, the twine carrying needles 236 passing above the sheet 262 on top of the bale, their clockwise movement causing yoke 230 to move members 212 upwardly until the yoke has passed it. As the tying operation is being completed, needles 236 move counterclockwise in the conventional manner carrying yoke 230 downwardly to engage member 212 and force it downwardly and hence causing chain 206 to move lever 202 upwardly and pivot latch 188 away from door 164 against spring 194 permitting door 164 to drop downwardly and open, which in turn releases hinged panel 185 to swing outwardly and release the side pressures on the bale to be discharged to facilitate its discharge. Ramrod 72 is then moved upwardly to reposition plunger 66 in its uppermost position. A sheet 262 is then passed through opening 264 to rest on the twine 238 within tower 4. As plate 99 is carried upwardly, opening 101 engages enlarged portion 60 of rod 56 when the plunger is still in the lower half of its travel and carries the rod upwardly hence raising pulley 46 and lowering line 40 within upper portion 6 to open door panels 30 and 32, thus permitting the accumulated tobacco to drop downwardly within the tower on to the waiting sheet 262 as the plunger is being raised. It will be seen of course that practically concurrently with the opening of door panels 30 and 32, rollers 138, 138 enter openings 152, 152 and on engagement with the upper side of openings 152, 152 are cammed downwardly to cause levers 134, 134, rods 130, 130 and levers 126, 126 to lower rods 123 and 124 and hence open door panels 106, 108, 110 and 112 thus permitting the tobacco to fall through plunger 66. The timing will ordinarily be such that the amount of tobacco which has accumulated in upper portion 6 will be almost sufficient to bring the level of tobacco in tower 4 to the desired point. Thus after some additional tobacco has dropped into the tower to produce the desired level of tobacco as seen through sight window 64, the operation is completed with the plunger 66 being lowered to compress the tobacco and force the previously formed bale of tobacco out past door 164 at which time the lowering of the ram is stopped and panel 185 is swung inwardly and door 164 closed. The ram is then lowered to a short distance above roller 252 of switch 244 and the cycle of operation previously described repeated.

What is claimed is:

1. A bailing apparatus comprising a tower having an upper open inlet end and a lower discharge end, means to close off and open up the discharge end, a hollow plunger telescoped within the tower, normally open door means in the lower end of said plunger, motor means to lower and raise the plunger, means to close the plunger door means when the plunger is lowered and to open the plunger door means when the plunger is raised, said motor means being adapted to carry the plunger downwardly to compact the material into the form of a bale at the bottom of the tower.

2. A baling apparatus comprising a tower having an upper open inlet end and a lower discharge end, means to close off and open up the discharge end, a hollow plunger telescoped within the tower, normally open door means in the lower end of said plunger, motor means to lower and raise the plunger, cam-actuated means to close the plunger door means when the plunger is lowered and to open the plunger door means when the plunger is raised, said motor means being adapted to carry the plunger downwardly to compact the material into the form of a bale at the bottom of the tower.

3. A baling apparatus comprising a tower having an upper open inlet end and a lower discharge end, means to close off and open up the discharge end, a hollow plunger telescoped within the tower, normally open door means in the lower end of said plunger, motor means to lower and raise the plunger, means to close the plunger door means at a point relatively near the uppermost position of the plunger when the plunger is lowered and to open the plunger door means at a point relatively near to the lowermost position of the plunger when the plunger is raised, said motor means being adapted to carry the plunger downwardly to compact the material into the form of a bale at the bottom of the tower.

4. A baling apparatus comprising a tower having an upper open inlet end and a lower discharge end, means to close off and open up the discharge end, a hollow plunger telescoped within the tower, normally open door means in the lower end of said plunger, motor means to lower and raise the plunger, cam-actuated means to close the plunger door means at a point relatively near the uppermost position of the plunger when the plunger is lowered and to open the plunger door means at a point relatively near to the lowermost position of the plunger when the plunger is raised, said motor means being adapted to carry the plunger downwardly to compact the material into the form of a bale at the bottom of the tower.

5. A baling apparatus comprising a tower having an upper portion with an open inlet end for the reception of material to be baled and a lower portion with a lower discharge end, means to close off and open up the discharge end, a hollow plunger telescoped within the lower portion of the tower and telescoped over the exterior of the upper portion of the tower, normally open door means in the lower end of said plunger, normally open tower door means between the open inlet end of the upper portion of the tower and the uppermost position of the plunger door means, motor means to lower and raise the plunger, means to close the plunger door means when the plunger is lowered and to open the plunger door means when the plunger is raised, means to close the tower door means when the plunger is lowered and to open the tower door means when the plunger is raised to release the material to be baled, said motor means being adapted to carry the plunger downwardly to compact the material into the form of a bale at the bottom of the tower.

6. A baling apparatus comprising a tower having an upper portion with an open inlet end for the reception of material to be baled and a lower portion with a lower discharge end, means to close off and open up the discharge end, a hollow plunger telescoped within the lower portion of the tower and telescoped over the exterior of the upper portion of the tower, normally open door means in the lower end of said plunger, normally open tower door means between the open inlet end of the upper portion of the tower and the uppermost position of the plunger door means, motor means to lower and raise the plunger, means to close the plunger door means when the plunger is lowered and to open the plunger door means when the plunger is raised, means to close the tower door means when the plunger is lowered and to open the tower door means when the plunger is raised to release the material to be baled, said last mentioned means including a line having one end fixed and the other end connected to the tower door means, a pulley engaging a bight in said line, an upstanding rod having an enlarged upper end supporting said pulley and a collar secured to the plunger and having an opening therein which freely embraces the lower portion of said rod and frictionally engages the upper portion of said rod, said motor means being adapted to carry the plunger downwardly to compact the material into the form of a bale at the bottom of the tower.

7. A baling apparatus comprising a tower having an upper portion with an open inlet end for the reception of material to be baled and a lower portion with a lower discharge end, means to close off and open up the discharge end, a hollow plunger telescoped within the lower portion of the tower and telescoped over the exterior of the upper portion of the tower, normally open door means in the lower end of said plunger, normally open tower door means between the open inlet end of the upper portion of the tower and the uppermost position of the plunger door means, motor means to lower and raise the plunger, cam-actuated means to close the plunger door means when the plunger is lowered and to open the plunger door means when the plunger is raised, means to close the tower door means when the plunger is lowered and to open the tower door means when the plunger is raised to release the material to be baled, said last mentioned means including a line having one end fixed and the other end connected to the tower door means, a pulley engaging a bight in said line, an upstanding rod having an enlarged upper end supporting said pulley and a collar secured to the plunger and having an opening therein which freely embraces the lower portion of said rod and frictionally engages the upper portion of said rod, said motor means being adapted to carry the plunger downwardly to compact the material into the form of a bale at the bottom of the tower.

References Cited in the file of this patent
UNITED STATES PATENTS

| | | |
|---|---|---|
| 1,110,087 | Wagner et al. | Sept. 8, 1914 |
| 2,613,592 | Nemir | Oct. 14, 1952 |